April 26, 1966 J. V. TARBELL 3,248,103
APPARATUS FOR STACKING A PLURALITY OF RIBBON-LIKE FILAMENT BUNDLES
Filed Feb. 11, 1964 5 Sheets-Sheet 1

INVENTOR
JAMES V. TARBELL

BY David Katz,

ATTORNEY

INVENTOR
JAMES V. TARBELL

BY David Katz.

ATTORNEY

April 26, 1966 J. V. TARBELL 3,248,103

APPARATUS FOR STACKING A PLURALITY OF RIBBON-LIKE FILAMENT BUNDLES

Filed Feb. 11, 1964 5 Sheets-Sheet 3

INVENTOR
JAMES V. TARBELL

BY David Katz

ATTORNEY

APPARATUS FOR STACKING A PLURALITY OF RIBBON-LIKE FILAMENT BUNDLES

Filed Feb. 11, 1964 5 Sheets-Sheet 4

INVENTOR
JAMES V. TARBELL

BY David Katz
ATTORNEY

INVENTOR
JAMES V. TARBELL

BY David Katz,
ATTORNEY

United States Patent Office 3,248,103

Patented Apr. 26, 1966

3,248,103

APPARATUS FOR STACKING A PLURALITY OF RIBBON-LIKE FILAMENT BUNDLES

James V. Tarbell, Wilmington, Del., assignor to E. I. du Pont de Nemours and Company, Wilmington, Del., a corporation of Delaware Filed Feb. 11, 1964, Ser. No. 343,995
4 Claims. (Cl. 270—52)

This invention relates in general to the problem of crimping tows of synthetic fibers and is particularly concerned with the stacking of the individual ribbons that are combined to form the tow.

Tows of synthetic fibers contain large numbers of continuous filaments having a total denier in the hundred-thousands. Mechanically crimping such a large mass of fibers is a critical operation. Crimping is usually done with a stuffer-box crimper of the general type disclosed in U.S. Patents 2,311,174 and 2,747,233. In this operation the tow, in the form of a flat ribbon, passes through the nip of two feed rolls under very high pressure. These feed rolls force the tow into a confined space, the stuffer-box, where its movement is restricted by a clapper plate which opposes the exit of the tow from the chamber. Because of the high pressure required on the feed rolls to force the tow into and out of the stuffer-box, there is danger of damaging the fibers. This danger is greatly increased if the tow coming to the crimper is non-uniform in thickness and width. Thick areas in the tow will result in excessive feed roll pressure and will cause slippage and abrasion of the fiber. The crushing and abrading will severely lower fiber strength. Thin areas in the tow will not be well crimped. This will result in crimped tow that will have poor cohesion and will split easily. These defective tows will be difficult to process into yarn, especially the conversion by stretch-breaking on the Turbo Stapler, described in U.S. Patent Nos. 2,419,320 and 2,748,426 or cutting on the Pacific Converter, described in U.S. Patent No. 2,438,469.

The present invention facilitates the preparation of tows of uniform dimensions suitable for crimping, with the result that crimping is uniform and very little fiber damage occurs. The invention provides apparatus for precisely stacking the individual ribbons that make up the tow.

As fibers are spun they are collected into strands, each strand being made up of fibers from a number of spinning units. These strands of fibers are drawn before combining to form the tow. The strands are flattened into ribbons by passage around the draw rolls, but the edges are thin and unsuited for stacking. Before they can be assembled into a satisfactory tow, the width and thickness of each individual ribbon must be adjusted. This can be done by means of width adjusting means in the drawing area. However, the width and thickness dimensions as thus obtained must be maintained until the ribbons are stacked into the tow.

Many efforts have been made to find adequate means of placing the individual ribbons in the tow. Most of the methods tried, however, cause distortion of the ribbon, and this makes it impossible to stack the ribbons accurately.

To appreciate the problem involved, it must be borne in mind that the ribbon is merely a non-coherent mass of individual filaments as distinguished from a belt or tape, which is a single entity. Pressure on one edge of a belt may displace the entire belt, but pressure on one edge of one of these ribbons will displace only the filaments which are contacted and will distort the ribbon.

It is accordingly an object of this invention to provide apparatus for guiding the motion of a plurality of ribbons of loosely assembled, continuous textile filaments, and for converging them without substantial distortion and stacking them with precision to form a tow. The word "stacking" here means arranging the ribbons in superimposed layers (or in a single layer), each layer comprising a group of said ribbons in contiguous side-by-side formation, all according to a prescribed pattern which will result in a tow of essentially uniform thickness throughout its width. Other objects and achievements of this invention will appear as the description proceeds.

Now according to the present invention and assuming for illustration a group of horizontal ribbons spread out initially in a horizontal plane, the aforementioned object is achieved by first rotating the initially horizontal plane of each ribbon through 90°, whereby to place the ribbon "on edge" so to speak; then bending the ribbon to the desired extent in a horizontal plane, and then rotating the ribbon back to a horizontal plane. Turning the plane is achieved by interposing vertical pins or posts in the horizontal path of the ribbon, at locations such that the ribbon, as it moves forward must contact with its broadside face the vertical edges of such posts. I have found that upsetting the ribbon in each of said turning steps is avoided, if sufficient distance is provided between the first post and the point where the ribbon was horizontal, and likewise between the last post and the point where the ribbon is again horizontal, whereby the turning of the ribbon is achieved gradually. The minima of said distances required for these purposes can be determined experimentally in any particular case. But for simplicity, thumb-rule guides in this respect are given hereinbelow.

For a clearer understanding of this invention, reference is now made to the accompanying drawings, in which FIG. 1 is a top view of a simplified layout illustrating the general principles of this invention and assuming, for simplicity, the production of a single-layer, stacked tow.

FIG. 2 is a schematic section of the stacked ribbons obtained with a device as in FIG. 1.

FIGS. 3 to 6 deal with the production of a two-layer tow, FIG.3 being a side view in a diagrammatic form of the entire layout, while FIG. 4 is a vertical section along line 4—4 of FIG. 3, FIG. 5 is a diagrammatic top view showing the preferred mode of threading the ribbons through the post assembly of FIG. 3, and FIG. 6 is a transverse section through the stacked ribbons which form the final tow.

FIGS. 7 and 8 represent another mode of producing two-layer stacking, FIG. 7 being a rear vertical view of the set of orienting posts 6 required, while FIG. 8 is a top view of the full assembly of guides, showing the mode of passing the ribbons through the assembly.

FIG. 9 is a rear vertical view of still another modified form of the orienting post assembly, while

Figure 15C:
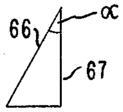
Figure 15B:
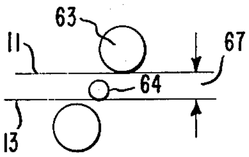
Figure 15A:
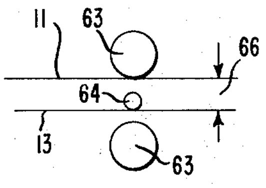

FIGS. 15 (*a*), (*b*) and (*c*) are related diagrams showing how the amount of overlap of the ribbons in the tow can be controlled by turning the plane of the bank of orienting posts on an axis at right angles to the plane defined by the center lines of the moving ribbons.

Figure 1:
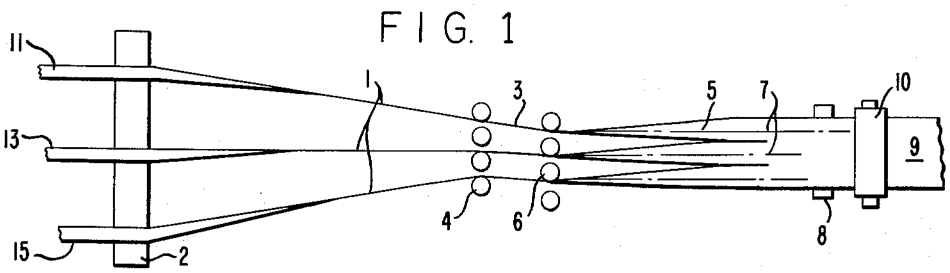
Figures 3, 4, 6:
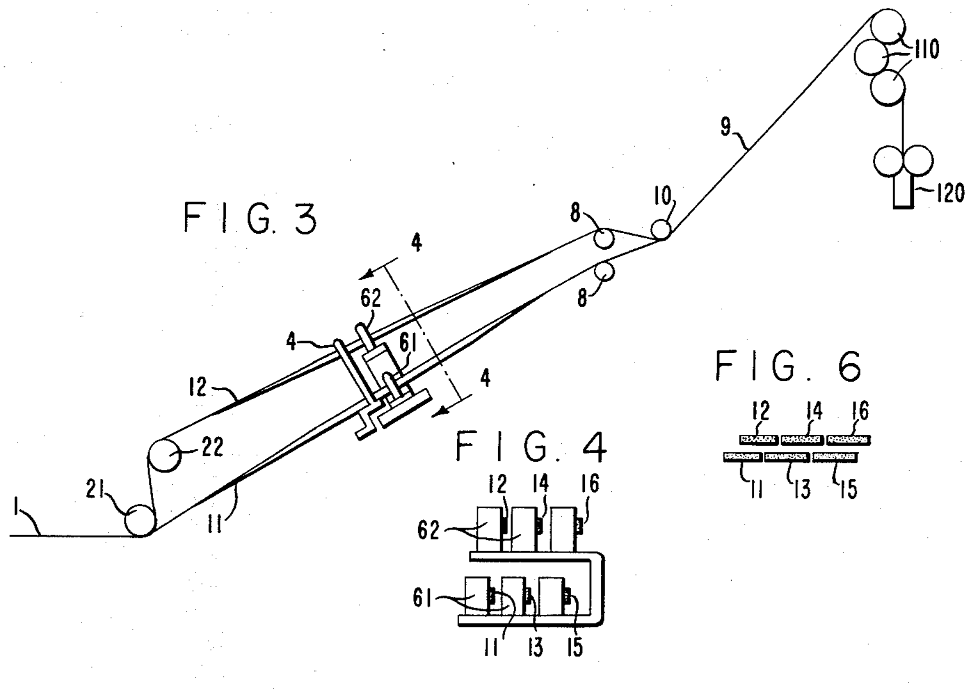

Taking up now the drawings in detail, FIGS. 1 and 3 represent the layout for a simplied situation, assumed for the sake of bringing out the basic principle of this invention. A number of filament ribbons 1 being taken from the wash-draw machine move in spread out formation over horizontal idling roller 2. Assuming that it is desired to converge them into a single-layer tow 9 after passing roll 10 on the underside, ribbons 1 are first directed toward a set of vertical guide posts (or "tensioning rollers") 4, each ribbon being made to pass in contact with one side of a roller from this set. The effect is to twist the ribbon about its center line through 90°, as a result of which each ribbon is "standing on its edge" in the region 3. Where stacking in more than one layer is desired, two or more ribbons may be made to contact the same side of a given roller, but at different heights, as a result of which, the ribbons will be progressing in groups or layers at two or more levels from point 4 on. The separation of the ribbons into layers travelling horizontally at different levels can be achieved as in FIG. 3 by using two rollers 21 and 22 in lieu of the single roller 2 of FIG. 1.

Next, each ribbon is made to pass in contact with the edge of a vertical post from set 6, following which the ribbons of each level group are eventually brought into contact with a horizontal roller of set 8 (of which there will be two or more in a vertical arrangement, when stacking in more than one layer is desired, as shown in FIG. 3). This causes each ribbon to twist back into a horizontal plane, as shown at 5 in FIG. 1. There is no further convergence in a horizontal plane of the plurality of ribbons which makes up each layer leaving the set of pins 6. In other words, while each ribbon is being given a −90° (or another +90°) twist about its center line (i.e. the longitudinal midline) following rolls 6, the several center lines 7, 7 are kept parallel to each other, each in fact being a horizontal straight line tangent to one of the posts 6 at the point where the vertically disposed ribbon breaks contact therewith. If posts 6 are properly spaced, the ribbons coming in contact with one of the rollers 8 will be touching each other without overlap or with a slight overlap, as desired. Accordingly, the bank of posts 6 act as orienting pins or guides.

As the several layers of oriented filaments leave the horizontal rolls 8 (FIG. 3) they now converge in a vertical plane and, coming in contact with each other, pass as a unit under roll 10, which completes the formation of tow 9. The whole filament system is made to move forward by conventional pull rolls 110 and is directed into the nip rolls of a conventional crimper 120, as shown in FIG. 3.

Figures 2, 7, 8:
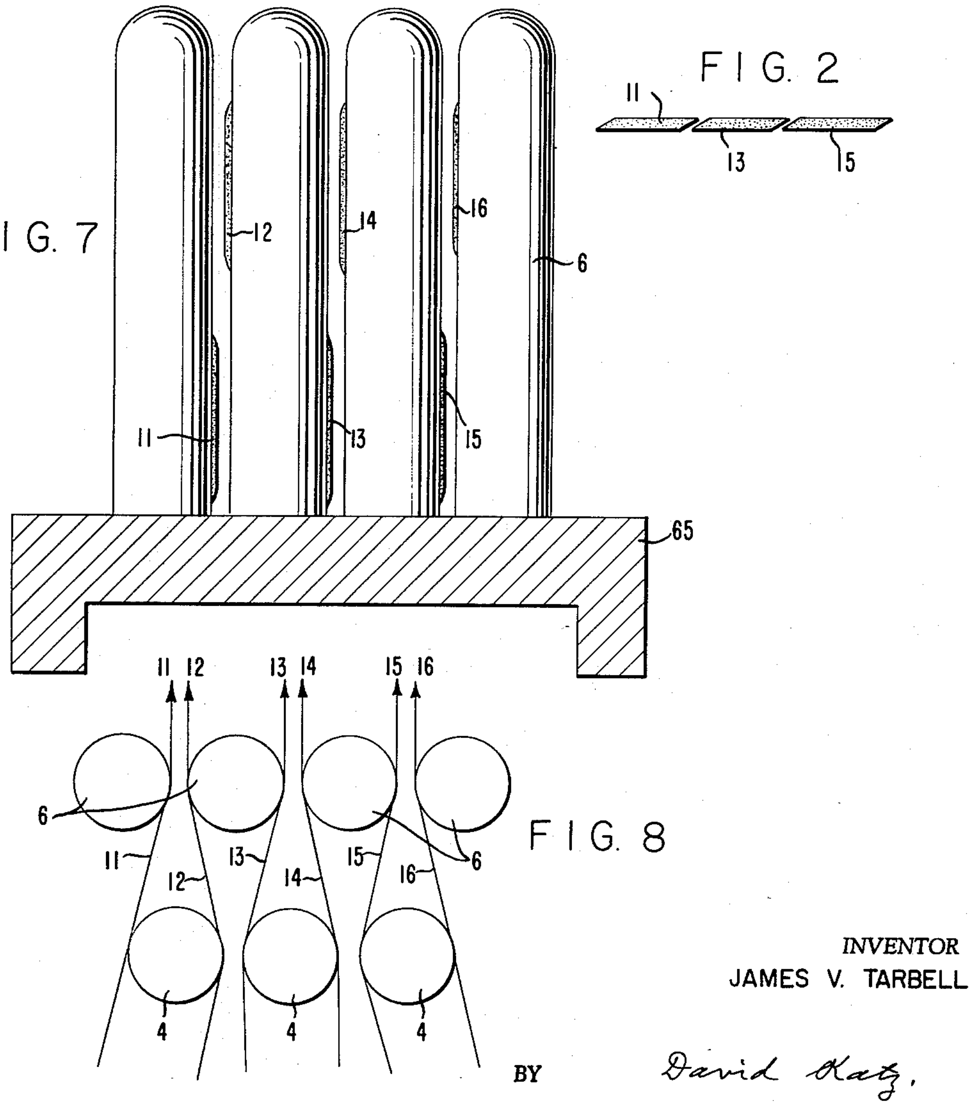

It will be clear from FIG. 1 that the distance between the centers of two adjacent orienting posts 6 must be essentially equal to the desired distance between the center lines of adjacent ribbons as they finally stack up on roll 8, if the line of posts 6 is perpendicular to the line of motion of the ribbons. If the line of posts 6 is inclined toward the line of motion, the component of said inclined line which is normal to the line of motion must be equated to said desired distance between center lines. This is explained more clearly later, in FIG. 15. The diameter and spacing of the set of tensioning pins 4 is not so critical, but it is preferred to have them arranged so that section 3 of each ribbon will contact oppositely facing sides of posts 6 and 4 (as illustrated in FIG. 8); that is, if a ribbon contacts its posts 4 on the side which faces up in FIG. 1, it should preferably contact post 6 on the side which faces down (and vice versa).

A problem encountered with the execution of a converging process as generally postulated in FIG. 1 is that the ribbons tend to upset (collapse; change into a distorted cross section) as they are being twisted longitudinally from the horizontal plane into the vertical or the other way around. I have found, however that if the pins 4 are set at a sufficient distance from roller 2, upsetting does not occur. The required minimum distance for prevention of upsetting varies both with the width of each ribbon and with its total denier. For instance, in the case of a 50,000-denier ribbon 1¼" wide, a distance of 48" (between rollers 2 and 4) has been found to give satisfactory results. The same distance is also satisfactory for a 100,000-denier polyester ribbon, provided its width does not exceed 1⅝". The exact minimal distance for any particular ribbon can be readily determined by experiment, but as a general proposition it may be specified that the twist of each ribbon per inch of travel shall not exceed a quantity $\Delta\theta$ which is a function of both the width of the ribbon and the average denier distribution therein per inch width. Thus, if we let L represent the distance in inches between roll 2 and post 4, and since the ribbon undergoes a total of twist of 90° in this distance $$\Delta\theta=\frac{90°}{L} \tag{1}$$

Now, let W represent the width of the ribbon in inches and $d$ the average denier per inch width, then the general rule may be expressed by the equation $$\Delta\theta=\frac{1+d/30{,}000}{W} \tag{2}$$

To illustrate, in the case above wherein a 50,000 denier ribbon of 1¼" width was used, $d$ is 40,000 while W is 5/4. Then $\Delta\theta$ calculates to 28/15 degrees per inch, while L, computed from Equation 1, becomes $$\frac{90\times 15}{28}\doteq 48 \text{ inches}$$

In the case of the 100,000 denier ribbon of 1⅝" width, $d$ is about 60,000

$$W=\frac{13}{8},\ \Delta\theta=\frac{24}{13}$$

and $$L=\frac{90\times 13}{24}=\text{ab. } 49''$$

In Formula 2, obviously $$d=D/W \tag{3}$$

where D is the total denier of the ribbon. If we set $r=D/30{,}000$, Formula 2 may be transformed into $$\Delta\theta=\frac{W+r}{W^2} \tag{4}$$

from which $$L=\frac{90W^2}{W+r} \tag{5}$$

If we assign $r$ a fixed value (e.g. 10/3 as in the second case above), it is easy to demonstrate through Formula 5 that if W is increased, say from 13/8, the value of L will increase.

Obviously, L may be made longer than the computed minimal distance. It will be further understood that the above formulas have not been developed for use with ribbons of widths outside those normally encountered in the synthetic filament art, and which usually do not exceed 3½ inches.

The same general rule applies also to the distance between posts 6 and rollers 8. Accordingly, the computed distance will automatically be equal to that selected for the distance between roller 2 and posts 4. In other words, an easy solution is to place the assembly of vertical guides 4, 6 about midway between rollers 2 and 8, but by experiment in any specific case different optimal conditions can be readily established.

The simplified layout shown in FIGS. 1 and 3 solves the basic problem, namely, how to converge a moving plurality of filamentary ribbons which are spread out side-by-side in a plane coincident with the flat dimension of each ribbon into a more compact arrangement, which may consist of more than one layer, but without upsetting the ribbons. In practice, however, collateral but equally important problems exist in the making of tows. One of these is the problem of designing the make ups of the several layers arriving at roll 10, or the problem of guiding the layers toward said roll so that they do not form weak lines running lengthwise of the tow (at right angles to its width). For instance, by reference to FIG. 2, if no overlap between adjacent ribbons were allowed, there would be a separation line running vertically between the edges of ribbons 11, 13 and 15. And even overlap can be tolerated only to the extent that the regions near the edges of the ribbons are commonly thinner than the average thickness of the ribbon; otherwise, unduly thick regions will be produced in the tow.

Figure 13:
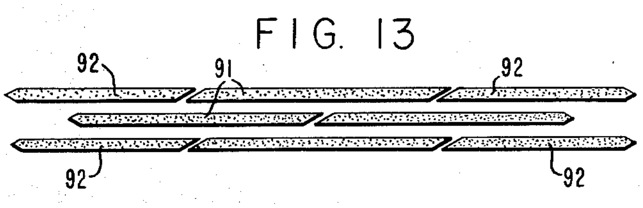

FIG. 13 shows one way of solving the problem; that is, by resorting to ribbons of different widths and stacking them up in staggered relation widthwise. Staggered or offset stacking may be resorted to also with ribbons of uniform width. This will leave the tow itself with edge portions which are thinner than the average thickness thereof, but the width of each narrow edge will be small relative to the entire width of the tow, and these edges can be upset (crowded in or turned under) by special devices after the tow has been formed. The problem therefore reduces itself to the simple problem of how to achieve staggered stacking with the invention set forth generally in FIGS. 1 and 3.

Figure 5:
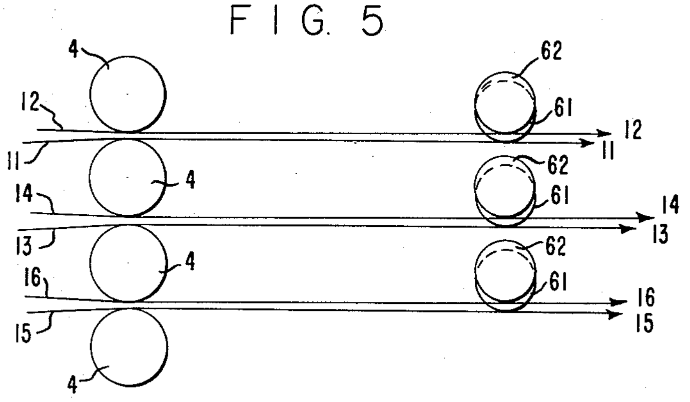

FIGS. 7 and 8 show one way of solving the problem of staggering the ribbon joinder lines among two layers. Alternate ribbons are grouped together and made to contact posts 6 on different sides and on different levels. For instance, ribbons 11, 13, 15 contact the posts 6 at the lower level and on the right sides of the posts (looking in the direction of travel in FIG. 8), while ribbons 12, 14, 16 are made to pass at a higher level and to contact posts 6 on their left sides. Stabilizing posts 4 are preferably made of equal diameter as posts 6, and are erected in staggered relation to posts 6. As shown in FIG. 8, a ribbon which contacts its post 6 on the right is made to pass in contact with the left side of corresponding post 4, and vice versa. The posts 6 are mounted on a turntable 65, so that the spacing between them can be varied, as discussed more fully below in connection with FIGS. 9 and 10. The spacing between adjacent posts determines the degree of ribbon staggering among the two layers Another mode of solving the same problem is shown in FIGS. 4 and 5. Instead of employing as orienting pins tall posts 6, as shown in FIG. 7, two sets of shorter pins 61 and 62 are here employed, which themselves are supported at different levels, as shown in FIG. 4. Then alternate ribbons, such as 11, 13 and 15 are made to contact pins 61 at the lower level, while the other ribbons (i.e. 12, 14, 16) are brought in contact with pins 62 at the upper level. The pins 61 and 62, however, are offset as to their vertical axes, so that ribbons 11, 13, 15 become offset in their vertical planes with respect to ribbons 12, 14, 16. Recalling that the midline of each ribbon after the latter has been turned back into the horizontal plane is a mere continuation of the direction along which the vertical ribbon breaks contact with post 6, the upper horizontal layer formed from ribbons 12, 14, 16 will have its lines of side-by-side contact offset with respect to the corresponding lines of layer 11, 13, 15, as shown in FIG. 6.

Figure 9:
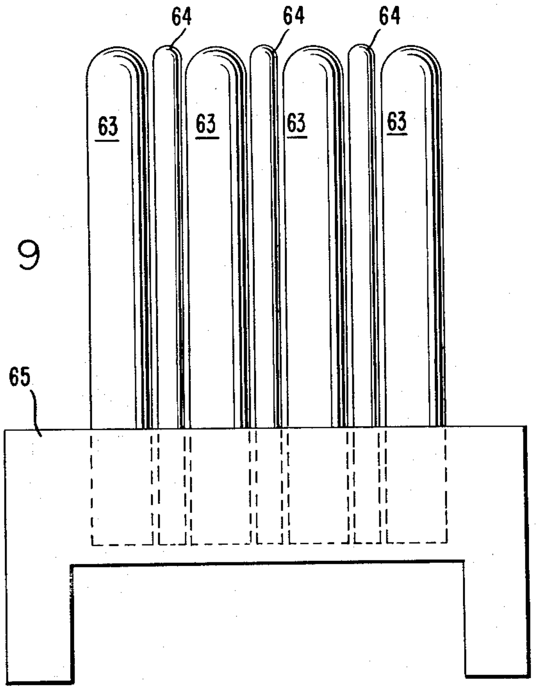
Figures 10, 11:
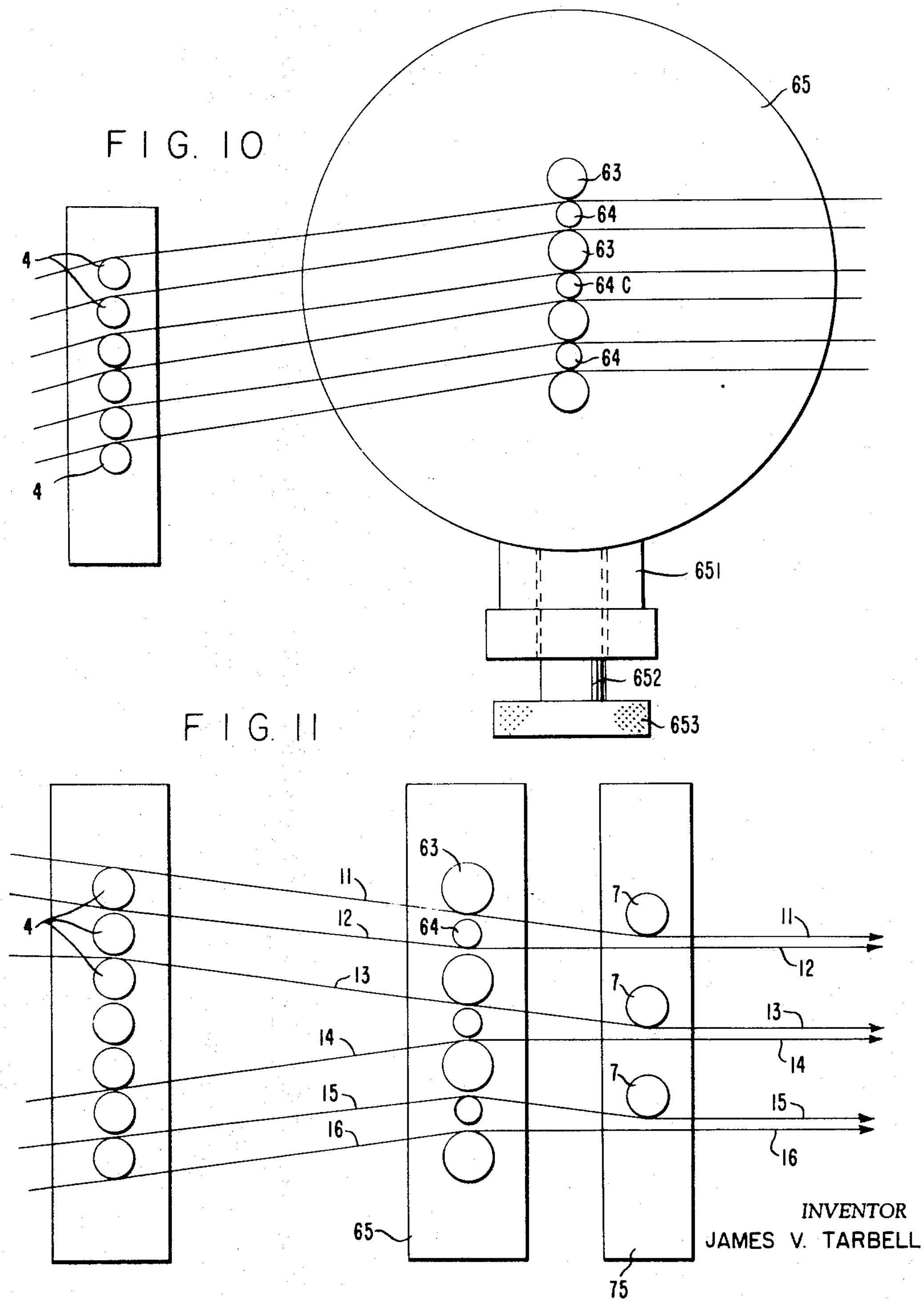
FIG. 10 is a top view of the full assembly, including the stabilizing guides and also showing a turntable arrangement for rotating the plane of the bank of orienting posts.
FIG. 11 is a top view of an assembly of a still further modified form, which includes the bank of orienting pins of FIG. 10 followed by a second bank of orienting pins.

A third way of solving the said collateral problem is shown in FIGS. 9 and 10. Here, pins of different diameters, 63 and 64, are employed, the pins 63 being in contact with the ribbons of one level (say 12, 14, 16), while pins 64 are in contact with the remaining ribbons (11, 13, 15) at the other level.

FIGS. 9 and 10 show also the solution to a second collateral problem. Because the filament ribbons are often thinner at the edges than throughout the major portion of their width (having what may be called a "pancake" cross section), it is sometimes desirable to deposit the ribbons on the stacking rollers in a mutually overlapping disposition, so as to produce a tow of the same thickness at the joinder line as it has essentially at all other points in its width. Furthermore, it is desirable to have an easy way for regulating the amount of overlap.

This is achieved in FIGS. 9 and 10 by erecting all the orienting posts on a horizontal turntable 65, with the central post 64C coaxial with the vertical axis of the turntable. A side bracket 651 may serve as an aid for rotating the table on its axis through small angles, while a screw 652 running through bracket 651 and bearing a knob 653 may be employed to give the turntable and pins a linear displacement at right angles to the line of travel of the ribbons.

The spacing between adjacent orienting pins in FIGS. 10, 8 or 5 is very small. It is of the order of about 1/32" where the width of the individual ribbons is about 5/8 to 1¼".) The spacing which is material is the distance between the edges of adjacent ribbons as measured perpendicularly to the center lines of the ribbons as they leave the region of the orienting pins. This is shown at 66 in FIG. 15 (*a*). When the entire bank of pins is turned however to the right or to the left from the vertical array shown in FIG. 10, the distance between their adjacent edges decreases, as shown at 67 in FIG. 15 (*b*). If the ribbons stacked up against stacking roll 10 have been just touching each other at the edges with the arrangement of FIG. 15 (*a*), they will be crowding each other or slightly overlapping in the arrangement of FIG. 15 (*b*). The trigonometric relation between the magnitudes of 67 and 66 is shown in FIG. 15 (*c*). "67"≐"66" cos $\alpha$, wherein $\alpha$ is the angle through which the turntable has been rotated on its axis.

In FIG. 11 is shown a modification of the embodiment of FIGS. 9 and 10. In FIG. 11, the bank of wide and narrow pins 63, 64 is followed (along the line of travel of the ribbons) by a bank of supplementary guides 7. These are arranged to contact only the ribbons of one layer (say ribbon 11, 13, 15) and are mounted on a table 75 which permits of slight linear displacements of the entire set 7 in a direction at right angles to the line of travel of the ribbons. It will be clear that when table 75 is displaced in said direction, the distance between the center lines of ribbons 11, 13, 15 on the one hand and ribbons 12, 14, 16 on the other hand will increase or decrease, respectively.

Figure 12:
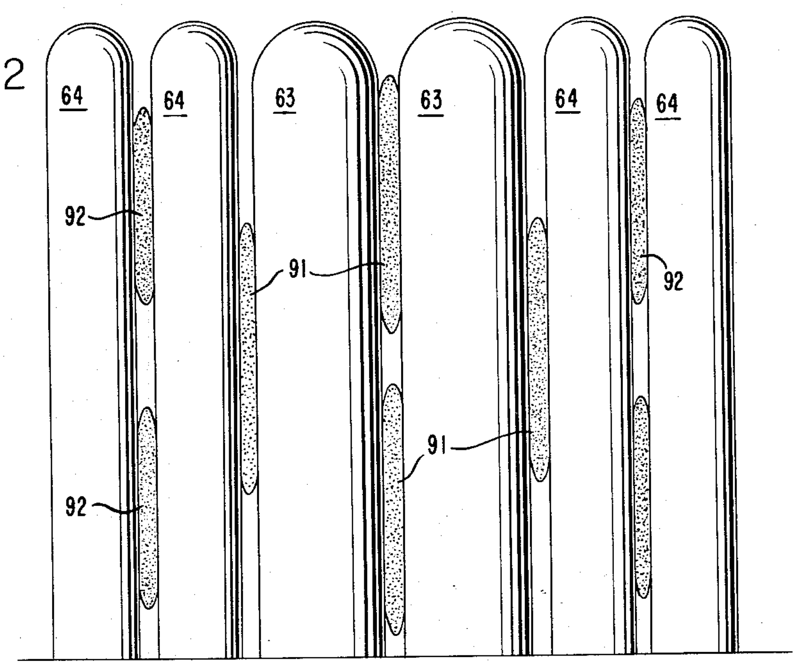
FIG. 12 is a rear view of a modification of this invention which is adapted particularly for achieving the special stacking scheme shown diagrammatically in vertical section in FIG. 13.

FIGS. 12 and 13 show still another modification of the orienting pin set up according to this invention, to avoid weak lines in the ultimate tow. Here, a three layer tow is contemplated, and it is preferred to make it up of four wide ribbons 91, 91 and four narrow ribbons 92, 92, laid out as in FIG. 13. Accordingly, two wide posts 63 and four narrow posts 64 may be set up, and the ribbons may be passed in contact with them as shown in FIG. 12.

Figure 14:
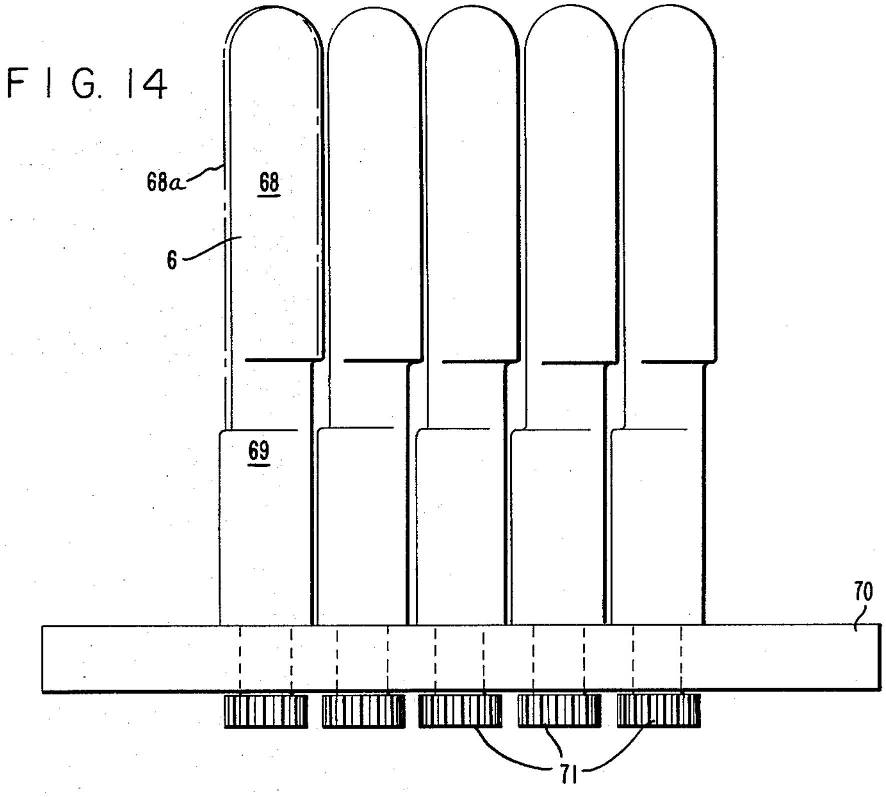
FIG. 14 is a still further modification of this invention, wherein offset orienting posts are used.

A fifth modification is shown in FIG. 14. Each post 6 is made up of two vertical sections 68 and 69 whose axes are offset with respect to each other. If the post is rotated slightly on the axis of its lower section, the upper section will become displaced as shown in dotted lines at **68*a*. Thus the distance between the center lines of the upper level of ribbons and those of the lower level can be readily controlled. To facilitate equal and simultaneous rotation for all posts, the lower portions 69 are set rotatably in suitable bores in a horizontal table 70, and their extensions below the table may carry spur gears 71**, which can be manipulated as a unit from a suitable worm or by the aid of interposed idling gears.

It will be understood that numerous other variations in the practical embodiment of the principles of this invention will be readily apparent to those skilled in the art.

I claim as my invention:

1. Apparatus for guiding a plurality of moving ribbons of loosely assembled continuous textile filaments to an area where said ribbons are assembled in a contiguous to partly overlapping contact, to form a relatively broad, moving tow of essentially uniform thickness, said apparatus comprising:

(A) an idler roll whose axis is parallel to an arbitrarily chosen zero plane, and means for pulling said plurality of ribbons across said idler roll and in contact therewith, (B) a first bank of spaced posts whose axes are directed transversely of said zero plane, said bank of posts being situated in spaced formation across the path of said moving ribbons, whereby to cause each ribbon separately to rotate its face through about 90° from its initial zero-plane disposition and to pass in contact with the edge of a selected post from said bank said bank being spaced from said idler roll at least a distance L in inches, wherein $$L=\frac{90W^2}{W+\frac{D}{30,000}}$$

and wherein W is the width of the ribbon in inches and D is the total denier of the ribbon.

(C) a second bank of spaced posts, situated further along the line of travel of said ribbons with their axes parallel to those of the first-mentioned bank (B), whereby to compel each of said separated and turned ribbons to pass in contact with the edge of a selected post from said second bank (C), said first bank of posts being individually adapted and arranged with respect to each post of said second bank of posts such that each ribbon makes contact with one post of said first bank on one side of said ribbon and makes contact with one post of said second bank on the other side of said ribbon, and further, the spacing of adjacent spaced posts of said second bank being directly proportional to the width of each ribbon and inversely proportional to the degree of overlap of said plurality of moving ribbons, (D) a group of idler rolls situated further along the path of said ribbons at least a distance L in inches with their axes parallel to said zero plane and in a position to intercept said plurality of moving ribbons and to turn their faces back to the zero plane, and (E) a roll beyond said group (D) with its axis parallel to the zero plane, said roll being situated to be contacted by the totality of said ribbons in contiguous and partly overlapping relation, whereby the totality of the fibers which leave said roll beyond will be disposed in a relatively broad, transversely continuous layer of filaments.

2. An apparatus as in claim 1, the entire formation of said second bank of posts (C) being supported on a base, means for rotating and moving linearly said base whereby to vary the angular disposition of said bank with respect to the path of the moving ribbons until a predetermined amount of overlap in the ribbons contacting said farthest idler roll in group (D) has been achieved.

3. Apparatus for guiding a plurality of discrete moving ribbons of loosely assembled continuous textile filaments to an area where said ribbons are assembled in a contiguous to partly overlapping contact to form a relatively broad, moving tow of essentially uniform thickness, said apparatus comprising:

(A) an essentially horizontal idler roll and means for pulling said plurality of ribbons in a horizontal plane across said idler roll and in contact therewith, (B) a first bank of fixed, vertical posts, said bank of posts being situated in spaced formation across the path of said moving ribbons, whereby to cause each ribbon separately to rotate its face into a vertical plane and to pass in contact with the edge of a selected post from said bank said bank being spaced from said horizontal idler roll at least a distance L in inches, wherein $$L=\frac{90W^2}{W+\frac{D}{30,000}}$$

and wherein W is the width of the ribbon in inches and D is the total denier of the ribbon, (C) a second bank of spaced, essentially round vertical posts, situated further along the line of travel of said ribbons, whereby to compel each of said turned ribbons to pass in contact with the edge of a selected post from said second bank, the entire formation of said second bank being supported on a horizontal base by the aid of which the entire bank can be caused to change its angular disposition with respect to the path of said moving ribbons without changing the vertical direction of the axes of the posts in said bank said first bank of posts being individually adapted and arranged with respect to each post of said second bank of posts such that each ribbon makes contact with one post of said first bank on one side of said ribbon and makes contact with one post of said second bank on the other side of said ribbon, and further, the spacing of adjacent spaced posts of said second bank being directly proportional to the width of each ribbon and inversely proportional to the degree of overlap of said plurality of moving ribbons, (D) a group of horizontal idler rolls situated further along the path of said ribbons at least a distance L in inches in a position to intercept said plurality of moving ribbons and for turning their faces back into a horizontal plane, the roll of said group which is farthest along the path of said moving ribbon being situated to intercept all said ribbons in a contiguous to partly overlapping relation, whereby the totality of the fibers which leave said farthest roll will be disposed in a relatively broad, transversely continuous, horizontal layer of filaments, and (E) means for manipulating the supporting base of said second bank of posts (C), whereby to vary the angular disposition of said bank with respect to the path of the moving ribbons until a preassigned amount of overlap in the ribbons contacting said farthest idler roll in group (D) has been achieved.

4. Apparatus as in claim 3, the entire second bank of vertical posts (C) being supported on a horizontal turntable by the aid of which said bank of posts can be rotated as a unit about a vertical axis, whereby to vary the distance between the center lines of any two adjacent ribbons as they leave the region of said bank of posts (C).

References Cited by the Examiner

UNITED STATES PATENTS

| | | | |
|---|---|---|---|
| 2,506,053 | 5/1950 | Zuckerman | 270—52 X |
| 2,821,383 | 1/1958 | Clemens | 270—50 |

EUGENE R. CAPOZIO, *Primary Examiner.*